United States Patent [19]
Kloper et al.

[11] Patent Number: 5,140,586
[45] Date of Patent: Aug. 18, 1992

[54] TOKEN ASSOCIATED DATA NETWORK COMMUNICATIONS PROTOCOL

[75] Inventors: Kenneth J. Kloper, Clarksburg, Md.; Michael E. Lee, Marshall, Va.

[73] Assignee: E-Systems, Inc., Dallas, Tex.

[21] Appl. No.: 616,083

[22] Filed: Nov. 20, 1990

Related U.S. Application Data

[63] Continuation of Ser. No. 491,866, Mar. 12, 1990, abandoned, which is a continuation of Ser. No. 148,754, Jan. 26, 1988, abandoned.

[51] Int. Cl.$^5$ .................................... H04J 3/26
[52] U.S. Cl. ............................. 370/85.5; 370/85.4; 370/85.15
[58] Field of Search .............. 370/85.1, 85.4, 85.5, 370/85.7, 85.8, 85.15, 94.1, 95.1, 95.2; 340/825.5, 825.51, 825.05; 371/11.1, 20.6

[56] References Cited

U.S. PATENT DOCUMENTS

| | | | |
|---|---|---|---|
| 4,464,749 | 8/1984 | Ulug | 370/94 |
| 4,506,360 | 3/1985 | Kryskow, Jr. et al. | 370/89 |
| 4,536,877 | 8/1985 | Livingston et al. | 370/94 |
| 4,556,974 | 12/1985 | Kozlik | 370/85.4 |
| 4,590,468 | 5/1986 | Stieglitz | 370/94 |
| 4,609,920 | 9/1986 | Segarra | 370/89 |
| 4,637,013 | 1/1987 | Nakamura | 370/85 |
| 4,649,535 | 3/1987 | Ulug | 370/89 |
| 4,667,323 | 5/1987 | Engdahl et al. | 370/85 |
| 4,682,326 | 7/1987 | Ulug | 370/89 |
| 4,707,830 | 11/1987 | Ulug | 370/89 |
| 4,745,598 | 5/1988 | Ulug | 370/89 |
| 4,747,100 | 5/1988 | Roach et al. | 370/89 |
| 4,785,449 | 11/1988 | Nakamura et al. | 370/85.4 |
| 4,789,982 | 12/1988 | Coden | 370/85 |

FOREIGN PATENT DOCUMENTS 0240738 10/1986 Japan .................................. 370/85

OTHER PUBLICATIONS

"PaRing: A Token Ring LAN with Concurrency", IEEE Computer Society Reprint, Oct. 7-9, 1985.

*Primary Examiner*—Benedict V. Safourek
*Assistant Examiner*—Alpus H. Hsu
*Attorney, Agent, or Firm*—Rogers & Killeen

[57] ABSTRACT

A multinodal bus network protocol used in communication systems employing tokens to indicate the next interface unit to transmit, with cojoining of token addressing and data in one trasmission, organization of interface units into logical rings whose token-passing sequence is a function of network topology, adaptive learning by each interface unit of the next unit to receive the token as well as the number of addressees in the ring, organization of interface units into groups where only one unit may answer for the entire group, and adaptive learning by each unit in a group of its predecessor in that group as well as the number of units in its group.

14 Claims, 3 Drawing Sheets

(PRIOR ART PROTOCOL)

(PRIOR ART PROTOCOL)

BIU    BUS INTERFACE UNIT

—*→    REPRESENTS LONG DELAY

TOKEN ASSOCIATED DATA NETWORK COMMUNICATIONS PROTOCOL

This is a continuation of application Ser. No. 491,866, filed Mar. 12, 1990, now abandoned, which was a continuation of application Ser. No. 148,754, filed Jan. 26, 1988, now abandoned.

The present invention relates generally to a method and system for controlling communications in a multinodal peer network system and particularly to a protocol for controlling transmission access to a multinodal peer network communications system, such as a Local Area Network (LAN).

LANs are known to include a transmission medium such as a twisted pair of wires or a coaxial cable which often is strung within a building or between buildings. Electrically attached to the medium are plural digital communicating devices such as computers, memory units, display devices and keyboard terminals. By linking together the various communicating devices through the medium, the capabilities of the devices may be shared, and thus more efficiently utilized.

It is well known for plural communication units to share a single (or plural) transmission medium. Each communicating unit is given an opportunity to transmit information on the medium while the other units "listen" to the medium to receive all messages addressed to them.

Numerous methods have been devised to control when each unit is given an opportunity to transmit or "access" the medium. In one scheme, only the communicating unit having possession of a "token" may transmit on the medium. The token is simply a signal indicating that access to the medium has been transferred from one communicating unit to another. It is the responsibility of the unit with the token to transmit one or more messages, if it has any, and to pass the token, i.e., send a transfer of access authority, to another unit.

Often, the communicating devices communicate with the medium through bus interface units (BIUs) which can be used (a) to translate the message formats of the medium (or bus) into messages more readily used by the device; (b) to free the device from the burden of monitoring the messages on the bus; and/or (c) to concentrate a group of relatively low frequency users of the medium into a single access point.

It is known for token passing LANs to be organized in the form of a physical ring, i.e., the medium is physically closed on itself (or on terminating units) and message traffic proceeds unidirectionally around the ring. Such a network is often termed a "token ring".

A "token ring" is a physical ring comprised of unidirectional buses that interconnect BIUs. In order for each BIU to talk to all others in the network, these BIUs must be connected to each other in a physical ring. The signal enters a BIU from only one direction, and exits the BIU separately. Thus, a message to one BIU must often pass through all other BIUs in the path to the message's destination. The order of BIUs on the bus (and so the sequence of signal transmission) is determined by the physical order of BIUs on the bus. This order often cannot be altered by software or command. A detailed description of the usual protocol utilized by this type of ring configuration is described in the IEEE 802.5 standards documentation.

A token bus is usually a bidirectional bus in which the signals may propagate to all BIUs without having to go through any. All BIUs may "hear" all messages on the bus directly. The bus may be thought of as a line that wanders among the BIUs, with BIUs attached in any order. Token bus has a network-unique "right to speak", the token, and this concept generally avoids or precludes collisions of messages. The advantage conferred by this ordered output and collision avoidance is ameliorated by the not insignificant overhead of maintaining the token. Since the ownership of the token (who has the next "right to speak") is passed along as the address contained in the token, ordering is usually software determinable (and alterable). The token bus is, therefore, a logical, not a physical ring.

The IEEE 802.4 Standard Token Bus protocol allows each BIU to send data (if it has any to send) for up to a specified period of time, and then it must, in its next transmission, pass the token along to the next (usually lower addressed) BIU in the network's logical ring. The BIUs are organized into logical rings that poll in descending BIU address order. The BIU learns which BIU it polls and which BIU polls it. Polling is done by a separate signal which follows others output by the BIU, if any. Typically, there are thirteen types of signals used in the IEEE 802.4 protocol including six for maintenance of the network, and four optional signals. When used, each is transmitted separately.

Under IEEE 802.4, each BIU in the network logical ring is required to poll for BIUs that have not, as yet, entered the logical ring. This is to be done if the token passing cycle has not reached some maximal time value. It is not possible for the cycle to reach a sustained minimal (undisturbed by a new BIU poll) time value. During the pollings for new BIUs, as well as during the procedures for adding new BIUs, other conversations between BIUs are denied. If several BIUs wish to enter the network at the same time (e.g., several BIUs powered-up at one time), the connection resolution process is deterministic, but may require multiple retries. In order to become a BIU that functions within the network, each new BIU must learn the identifier for "This Station", the "Next Station" it polls, and the "Previous Station" which polls it.

Logical ring repair under IEEE 802.4 depends on the number of consecutive BIUs that fail. If only one fails, then a poll of it fails, the retry of the poll fails, and a "WHO FOLLOWS" message is sent out. The BIU following the failed BIU responds with a "SET SUCCESSOR" message, and the repair is accomplished. However, if more than one BIU fails at nearly the same time (e.g., they have a common power source), then a conversation with several specific types of node management transactions is required. Each of these requires unique logic paths, depending on whether smaller address windows, larger address windows, non-responding addresses, etc. are being interpreted or resolved.

In one known communications system, described in an article by Scavezze, in the Jun. 16, 1981, edition of *Electronics*, each node of the network is provided with the order in which the nodes will transmit on the medium. Each node transmits a "SOUND OFF" message during each cycle of control through the nodes, followed by the transmission of data, if any. If a node fails to send its "SOUND OFF" message within a predetermined time from the termination of the previous message, the other nodes are thereby informed that the node has failed and that the next node in the list will be the next to transmit.

In summary, the token is normally passed from station to station using a token pass signal. If a station fails to pick up the token, the sending station uses a series of recovery procedures that grow increasingly more drastic as the station repeatedly fails to find a succesor station. Normal data transfer activity between operational BIUs is precluded during the mandated repair period.

Also under IEEE 802.4, a group address is used to address a signal to multiple destination stations. A group address is an address associated by convention with a group of logically related stations. Group addresses may be associated with zero, one, or more stations on a given network.

Systems using IEEE 802.4, often do not have a method of permitting some BIUs relatively more frequent access to the medium for transmission of data. Some communicating units, such as manual keyboards, operate relatively slowly (by computer standards) and therefore do not need to frequently transmit data. On the other hand, other types of communicating units, such as BIUs connected to host CPUs, alarm indicators or emergency equipment, may need to be polled frequently for messages. If all BIUs are polled at the same rate, the BIUs needing a fast poll rate are not polled as quickly as may be possible because the "slow" BIUs are being polled more often then necessary.

In some prior art systems, tokens are passed in ascending or descending order of the address of the BIUs. If care is taken in selecting addresses of BIUs during initial installation of such systems, propagation delays associated with token passing can be minimized, i.e., a BIU will always pass the token to a BIU which is physically adjacent on the transmission medium and not to BIUs which are physically distant. When additional BIUs are added to such a system, the BIUs may preferably be addressed such that adjacent addresses are physically proximate. Obviously, keeping track of the physical and address locations of each BIU in a system can be burdensome and such records are often not kept. Thus, new devices (or replacement devices) in such systems may be added to the system with little, if any, regard for propagation delay and the efficiency and data rate of the system suffer.

Accordingly, it is an object of the present invention to provide a novel method and system of communication which yields faster network performance than available with the IEEE 802.4 standard Token Bus or other known protocols.

It is another object of the present invention to provide a novel method and system of communication in which selected communicating devices are polled for transmission more frequently than other devices.

It is still another object of the present invention to provide a novel method and system of communication in which new communicating devices may be dynamically added to a communicating ring without the requirement for a periodic poll to new devices.

It is yet another object of the present invention to provide a novel method and system of communication in which broken ring repair can be made while carrying on normal traffic.

It is still a further object of the present invention to provide a novel method and system of communication in which devices are added to a communicating ring in a manner to avoid long propagation delays between adjacent polls.

It is another object of the present invention to provide a novel method and system of communication in which the token is passed along with the message.

It is yet a further object of the present invention to provide a novel method and system of communication in which selected devices may be provided relatively greater access to the medium for transmitting messages.

It is still another object of the present invention to provide a novel method and system of communication in which silence on the transmission medium can replace a poll and the communicating devices adaptively learn which device should next be polled.

These and many other objects and advantages will be readily apparent to one skilled in the art to which the invention pertains from a perusal of the claims and the following detailed description of preferred embodiments read in conjunction with the appended drawings.

DETAILED DESCRIPTION OF A PREFERRED EMBODIMENT

Figure 1:
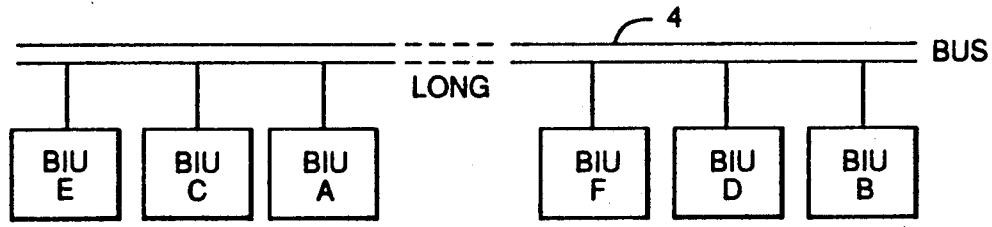
FIG. 1 is a diagram of a communication system of the type that may use the method of the present invention.

With reference to FIG. 1, a communication system, such as a Local Area Network ("LAN") may include a bus transmission medium 4 and bus interface units (BIUs) designated by the letters A through F. BIUs B, D and F are physically located relatively close to each other and relatively remote from BIUs A, C and E. Each of the BIUs may be connected to one or more communicating devices (not shown) which transmit data thru the BIUs to or from the bus 4. The bus 4 may be any conventional transmission medium, such as a twisted wire, transmission line, cable, or the air in the case of radio communications. The bus 4 may be unidirectional or bidirectional, establishing a logical ring through which messages and data move from BIU to BIU.

The BIUs transmit and receive data to and from the bus 4 using conventional communications electrical interfaces and data encoding or modulating techniques.

The bus 4 which interconnects the BIUs may be a bidirectional bus, as shown, or a unidirectional ring as is well known. Access to the bus for transmission is determined in a sequence known to all of the BIUs. The sequence utilized in the preferred embodiment is a token passing scheme in which a token is passed from one BIU to another to indicate which BIU has the authority to transmit messages on the bus 4. BIUs may transmit only within a predetermined time period after receiving the token and must, in addition to sending any messages which they have to send, pass the token to the next bus in the sequence before the end of the predetermined interval time period. The passing of the token, which may be merely a signal, is known as a poll (of the next BIU in the logical ring). Under certain circumstances, a BIU may be permitted to poll itself for a certain limited number of times.

Communication systems using this ring and token system may be an efficient method of conveying messages and data from user to user within an office, a building, or among users miles apart. The longer the distance between the users, however, the greater the time delay encountered while each BIU waits for its turn in the LAN sequence.

With continued reference to FIG. 1, the propagation delay between transmission and receipt of a message from BIU A to BIU B is longer than the time delay for a message sent from BIU A to BIU C. Propagation delay of the signal is determined by the speed of light in the transmission medium and the distance to be traversed.

In prior art systems, the token may be passed in ascending or descending order of addresses of the BIU. Assuming that in the system FIG. 1 the addresses decrease unidirectionally from F-A, the polling sequence of the communication system of FIG. 1 in the prior art may have been F→E→D→C→B→A→F. Note that each of the polls traverses a considerable distance along the transmission medium. The traversal of such a long distance results in a relatively long period of time for polling to occur and decreases the efficiency of the communication system.

While prior systems may have been able to avoid the long propagation delays seen in the previous examples by readdressing the BIUs to assure that shorter distance is needed to be traversed for each poll, such determinations are often made manually and required reconfiguration of a system when additional BIUs are added.

Figure 2:
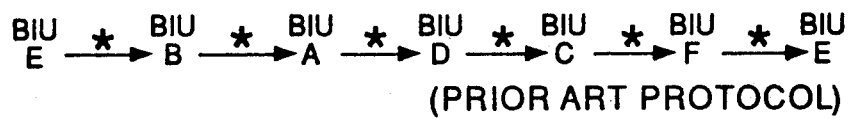
FIG. 2 is a schematic diagram of propagation delays that may be encountered using a communications protocol from the prior art in a system with paths illustrated in FIG. 1.

With reference to FIG. 2, using the prior art (TEEE 802.4) protocol, the polling order is arranged without reference to an efficient sequence and may even cause a maximal ring traversal time. Such a maximal sequence may result when BIUs are added in the order B-A-D-C-F-E to a LAN having the topographic layout illustrated in FIG. 1.

The present invention organizes BIUs into rings whose polling sequence is a function of network topology. With reasonably frequent polling, the most frequent event at a poll is that there is no data to send. The second most frequent event is that there is but one block of data to send. During ring formation, as each BIU enters, the BIU enters a "Learning State". In this state, the BIU chooses to enter the ring between those two BIUs that it hears as having the longest delay between a poll and the reply to that poll. This prevents BIUs from being sequenced so that they have maximal propagation delay.

Each BIU monitors the signals carried by the transmission medium to determine what delays are encountered throughout the LAN. Each signal carries enough information with it to allow the BIUs to determine propagation delays. Significantly, and in a departure from the prior art, the token (polling) signal and data signal are combined.

With this information, each BIU learns where it is in relation to other BIUs and uses this information to determine an efficient location in the sequence for new BIUs.

In a system in accordance with the present invention, the order of polling is not determined by the address of the BIUs but is determined dynamically by a BIU upon entry into the network. Each BIU which wishes to enter the polling cycle monitors the signals on the bus 4 to assimilate information about the network before trying to enter it. For example, the BIU may gain information regarding the number of nodes. The BIU will also determine which two BIUs have the largest times heard between poll and answer. It is between these two BIUs that the entering BIU will attempt to insert itself into the logical ring. Further, a unique addressed BIU will attempt to insert itself between other unique addressed BIUs and a group addressed BIU will attempt to insert itself between other group BIUs.

For example, assume that the response times in microseconds observed between polling BIUs during the learning cycle of the entering of BIU is (the prefix "G" denotes a group addressed BIU):

| BIU | BIU | MAXIMUM RESPONSE TIME IN MICROSECONDS |
| --- | --- | --- |
| A | B | 1.3 |
| B | C | 0.6 |
| C | Ga | 0.8 |
| Ga | Gy | 0.9 |
| Gy | A | 1.0 |

The possible insertion points in the polling cycle for a unique address BIU are between BIUs A and B, and between BIUs B and C. Note that all other insertion points in the example are associated with group address BIUs which are avoided as insertion points if possible. Since the first insertion point has a longer polling response time, the entering BIU will attempt to insert itself between BIUs A and B.

Figure 3:
FIG. 3 is a schematic diagram of propagation delays that may be encountered using the method of the present invention in a system with paths illustrated in FIG. 1.

With reference to FIG. 3, the protocol of the present invention will result in a different sequence of polling from that depicted in the protocol of the prior art.

Use of the protocol of the present invention does not guarantee that a minimal traversal time has been created, it only creates a polling sequence that avoids maximal times. If, for example, the BIUs are added to the network shown in FIG. 1 in the order B-A-D-C-F-E in the time delays as depicted in FIG. 1, BIU D would fall into the sequence between BIU A and BIU B, BIU C between BIU A and BIU D, BIU F between BIU D and BIU C, and BIU E between BIU F and BIU C. The resulting logical ring is depicted in FIG. 3. Where a change in the polling order does not affect the ring traversal time, BIUs are added to the ring in a psuedo random sequence.

Data may be sent via the protocol of the present invention under two modes: (a) datagram mode for which data are addressed to a group or promiscuous address under which the positive receipt of data is not required, (b) and a reliable mode in which data are sent to a unique or individual address, under which a verified receipt of data may be required. The receipt of the data may be supplied by a tack on acknowledgement which is sent immediately after the receipt of the data in a contention free time period as shown in the E Systems, Inc., owned, Livingston, et al., U.S. Pat. No. 4,612,653. If a BIU receives a token not associated with reliable data, it will output its own message/token or frame within four microseconds. If a received token is associated with reliable data, the receiving frame is to be sent within four seconds of the acknowledgement's completion.

A BIU which has no data to send out its polling time, may pass on the minimum token with a new source and destination addresses.

A Group is a set of logically related BIUs with a common group address. If that Group Address is polled, then only one BIU responds. Each BIU in the group is triggered to respond to the poll when one particular BIU in the group has responded previously. Groups may be designed into a network when a set of BIUs meet the criteria that each BIU in that set has both a common address and a limited maximum frequency of output. By attaching each BIU in that set to a group, the token cycle time for the network is decreased, which gives a greater polling frequency. This yields a responsive network.

There may be many groups in the network. Attaching a BIU to a group does not limit or affect the BIU's capacity to receive data. However, if the number of BIUs in the group is excessive, then the frequency with which each BIU in the group is polled from may be insufficient.

If a BIU has more messages to send, it may address the destination of the poll to itself, i.e., Self Poll. The maximum number of times a BIU may self poll is set within a system. For an example of a polling sequence with BIUs A and B (with specific addresses) and group G (consisting of BIUs L and M), a polling scheme may proceed as:

A→G (answered by L), →B→A→G (answered by M), →B→A→G (answered by L), →B→. . . etc.

Because nodes may be polled in an order unrelated to the address of the nodes, the nodes may be addressed in a variety of ways which may improve the performance of the network. Nodes may be addressed by their ASCII expression of their logical function. For example, if a network analysis function is performed by one of the nodes, messages from the other nodes to the analysis node may be addressed to "ANALYZ". The nodes sending analysis messages need not know the physical identity or permanent address of the analysis node but may communicate on a logical level because the address of the node no longer determines its polling position.

To enter the polling cycle, a BIU will deliberately cause a collision. In the system of preferred embodiment, addition of BIUs is the only event where collision is intentional. The collided BIU loses its turn/token. The colliding BIU has an interval, randomly up to the "slot" time (e.g., 51.2 $\mu$ secs.) in which to issue its repair (entry) node management message. This time is chosen to be random so that if more than one BIU wishes to enter, the first BIU to issue the message enters; other BIUs that hear this transmission reenter the learning state since there is new information to learn. If a large number of BIUs attempt to enter the ring at the identical instant, approximately 90% will hear other BIUs collide and reenter the learning state; 10% do collide and retry. These BIUs that have collided are given a random time (e.g., up to 51.2 $\mu$ secs.) in which to initiate their entry transmissions. For example, one thousand BIUs attempting to enter the network would have the contention resolved in about four or five polling times.

The node management message that is issued simply directs another BIU to poll the colliding/inserting BIU. The inserting BIU will now poll the BIU which the collided BIU polled previously. All BIUs will be apprised of the new number of BIUs on the network.

The protocol of the present invention also allows the BIUs to quickly learn a new system configuration that may be caused by the failure of one or more BIUs. The BIUs learn a new consistently repeated network configuration and, in effect, repair the ring. Each BIU learns the next BIU to poll as well as the number of addresses in the logical ring. The utility of the adaptive knowledge of the number of addresses in the logical ring results in the ease of repair of broken rings, as well as continuation of ring function during the time of repair. It is the reaction of this protocol to line silence that allows expeditious repair, since a period of silence (equivalent to a slot time) is counted as a direct poll only by the BIU expecting that poll.

Using FIG. 3 in an example of ring repair, assume that BIU C has failed just after BIU A has issued its poll. BIU A, knowing the number of BIUs in the network, expects to be polled again after five polls. However, the poll of C by BIU E is greeted by line silence. When the length of that silence equals the time a BIU takes to poll, then it is taken as a poll by BIU A. So the BIU responds, just as if it had been polled, and without undue delay. The ring remains functional during the repair process. Now, BIU E listens to which BIU responds to its poll of C. After a predetermined number of consistent repetitions of BIU A replying to BIU E, BIU E has adaptively learned to poll BIU A next. Also, all BIUs have learned that there are now only five BIUs in the ring. The ring is fully repaired.

Consider the case of multiple failures, such as might occur when a single power supply to several BIUs fails. BIUs B, C, and E all fail. BIU F polls BIU E. After one poll time of silence, BIU C (if it were operational) would respond. In fact, after two poll times, BIU A does respond. BIU A's poll of BIU B is now greeted by a poll time of silence. BIU D takes this as a poll, and responds. The functioning part of the network continues to operate. After a predetermined number of consistent repetitions of this, BIU A has learned that the BIU that responds to its poll is BIU D, and so it polls BIU D next. BIU F has learned that the BIU that responds to its poll is BIU A, and so it polls A next. All BIUs have learned that there are only three BIUs left in the network. The network has adaptively learned its new configuration, D→F→A.

Figure 4:
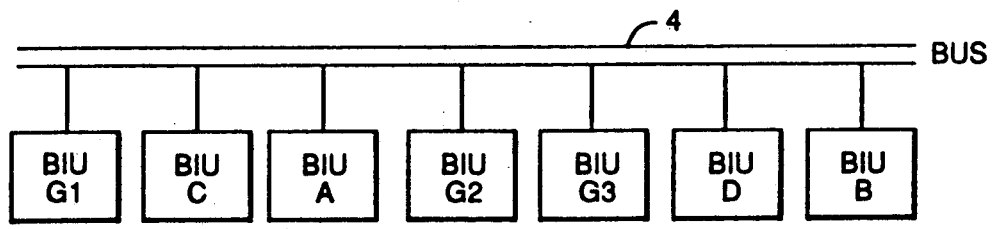
FIG. 4 is a block diagram of an alternative embodiment of a communication system of the type that may use the protocol of the present invention illustrating the use of a group of BIUs.

With reference to FIG. 4, a group of BIUs may be defined in this protocol to be a collection of BIUs that may have functionality for common data, or are otherwise logically related. They may all receive data addressed to their common group address or individually to their unique address. They also allow, however, just one individual BIU to respond to a token when it is addressed to the group. Thus, by using groups, the network may have a much smaller number of polling addresses than BIUs; polling the entire network is more rapid than if each BIU had to be addressed as an individual BIU during each polling cycle.

Adaptive learning by each BIU in a group of its predecessor in that group, as well as the number of BIUs in its group allows groups to function while they effect repair. The methodology of this repair is similar to the repair of uniquely addressed BIUs, discussed above. Each BIU in a group is triggered to reply to the poll of its group address by a previous reply to its group address by a particular BIU in the group. For example as depicted in the system of FIG. 4, we might have BIUs with unique addresses A through D and the group G with the BIUs G1, G2, and G3. The poll of the group G by BIU D might cause BIU G1 to respond. The subsequent poll of group G will cause BIU G2 to respond. A subsequent poll of group G will cause BIU G3 to respond. In order for this group to operate and maintain itself, each BIU in the group should know its group predecessor (in the case of BIU G2, it is BIU G1), and the number of BIUs in the group.

Although collisions on the transmission medium are generally avoided, there are times when collisions occur: collisions occur in case of hardware/protocol malfunction (inadvertently), and in the case of one or more BIUs adding themselves to a polling ring. In a system according to the present invention, collision is the linchpin of the additive mechanism. Following the caused collision, the colliding BIU attempts to initiate a Node Management message inserting itself onto the polling ring in RND(51.2) $\mu$ secs. from the termination of the collision after a two $\mu$ sec. delay. (The expression RND(N) will mean an (essentially) random number from zero up to N and is usually in $\mu$ secs). Following the collision, it will issue a Node Management message while continuing the interrupted poll in sequence. Additionally, if silence is detected on the bus by any BIU, then a token/poll is to be issued in (51.2*N)+RND(51.2) $\mu$ secs., where N is the number of polls to be heard before this BIU expects to be polled. The collision, or Jam signal, identical to the IEEE 802.3 standard, and may be sent for the same time. A poll that is triggered by a line silence will be an Auto-poll containing both the BIU's Unique and Group Address. This facilitates ring repair.

The following table illustrates the reaction of BIUs to collision and line silence:

If a collision reoccurs when attempting to enter the logical ring, then the BIU will retry in 2+RND(55.2) $\mu$ secs.; two BIUs claiming to have a token is erroneous and is unusual. If a line silence is heard following either a collision or transmission that exceeds 55.2 $\mu$ secs., then the following BIU will then transmit. If the line silence lasts 110.4 $\mu$ secs., then the next following BIU will send its own transmission. And so on, in units of 55.2 $\mu$ secs. To facilitate repair, an Auto-poll is triggered by line silence. After the Auto-poll, the BIU responds to its own poll normally.

Ring start-up:

A BIU will issue an Auto-poll when it hears nothing on the bus for 10 ms. plus RND(10000) $\mu$ secs. If there is a collision, then the colliding BIUs enter the Learning state. If an "only" BIU hears another BIU Auto-poll, it will issue a Node Management frame making it a member of a ring of two nodes. If the BIU hears silence, it will continue to Auto-poll at a predetermined frequency. The frequency with which the BIU polls itself may be kept to a low rate to prevent a "deaf" BIU from drastically interfering with a functioning network.

Adding a node to a ring:

Each BIU that is not a member of a group will try to enter the logical polling ring as a Unique Address BIU. If the BIU finds it is a member of a group, the BIU will add itself to the network utilizing its Group Address. If its Group Address is not heard on the bus, it will add itself to the network as a new group (which is handled similarly to the addition of a Unique Address to a polling ring); if the Group is present in the polling cycle, it will add itself to the heard matching group.

All BIUs listen for a predetermined member of polling cycles (e.g., three) to assimilate significant information about the network before trying to enter it. The BIU will attempt to observe the following rules, given in descending order of priority, in choosing where to insert itself in the logical polling ring:

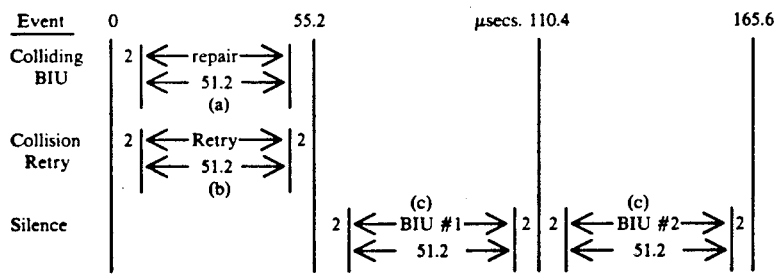

(a) = 2 + RND(51.2)
(b) = 2 + RND(51.2)
(c) = (55.2 * N) + 2 + RND(51.2), where N = (number of addresses in ring) − (number of polling address counted this polling cycle)

A BIU that wishes to enter the polling cycle will cause a collision. This colliding BIU has up to 55.2 $\mu$ secs. to issue its repair message. This time is chosen randomly so that if more than one BIU wishes to enter, the first BIU to issue the message enters; other BIUs that hear this transmission reenter the Learning state since there is new information to learn. If several BIU's wish to enter, and then collide in their efforts to issue a repair message, then only these BIUs that have just collided retry their repair messages. These collided BIUs now have 2+RND(55.2) in which to initiate retry transmissions. The BIU that was collided with looses its token.

a Unique Address BIU will attempt to insert itself between other Unique Address BIUs, a Group Address BIU will attempt to insert itself between other Group Address BIUs, the BIU will attempt to insert itself in the polling ring between those two BIUs that have the largest times heard between poll and answer.

Therefore, the BIU enters a "Learning" state from its original Initialization state in order to record information about the network. It may record the longest times between BIU responses associated with the polling and responding BIU, usually, the BIU does not record times associated with reliable data frames and their associated acknowledgements. For example, assume that the polling sequence heard is:

AAAAAA to BBBBBB to CCCCCC to Grpaaa,
Grpaaa (actual BIU GRPAAA) to Grpyyy,
Grpyyy (actual BIU GRPYYY, only in this group) to AAAAAA,
AAAAAA to BBBBBB to CCCCCC to Grpaaa,
Grpaaa (actual BIU GRPBBB) to Grpyyy,
Grpyyy to AAAAAA to BBBBBB to CCCCCC to Grpaaa,
Grpaaa (actual BIU GRPAAA) to Grpyyy,
Grpyyy to AAAAAA to BBBBBB, etc.

Further, assume that the response times in $\mu$ secs. observed between the polling BIUs during three "learning" cycles is:

| BIU | Next BIU | Maximum response time in $\mu$secs. |
|---|---|---|
| AAAAAA | BBBBBB | 1.3 |
| BBBBBB | CCCCCC | 0.6 |
| CCCCCC | Grpaaa | 0.8 |
| Grpaaa | Grpyyy | 0.9 |
| Grpyyy | AAAAAA | 1.0 |

The possible insertion points in the polling cycle for a Unique Address BIU are between BIUs AAAAAA and BBBBBB, and between BIUs BBBBBB and CCCCCC. Note that all other insertion points in this example are associated with Group Address BIUs, which are avoided as insertion points. Since the first insertion point has a longer polling response time, BIU NNNNNN will attempt to insert itself between BIUs AAAAAA and BBBBBB. Assume, further, that this decision is made when the network polling is such that Grpaaa is attempting to poll Grpyyy. BIU NNNNNN interrupts this poll, causing a collision. As soon as this collision terminates, and randomly within 16.0 $\mu$ secs., BIU inserts itself into the network between nodes AAAAAA and BBBBBB and informs the network that there are now six addresses in the logical ring.

Group start-up:

Each BIU that has a non-zero group address will attempt to enter the polling ring as a group. If no other BIU has the same Group Address, the BIU will enter the ring using its new Group Address in a way similar to that a new Unique Address node would enter. However, it would choose first to enter just after any previously defined groups. Using the example above, the BIU Grpnnn (Unique Address GRPNNN) might attempt to enter this sequence after Grpaaa. Further assume that the network polling sequence is up to a poll of BBBBBB by AAAAAA. Then GRPNNN will interrupt this poll, causing a collision. In 4 $\mu$ secs. of collision termination, and randomly within 16.0 $\mu$ secs., BIU GRPNNN inserts itself into the network as a New Group polled after Grpaaa and informs the network that there are six addresses in the logical ring.

Adding a node to a group:

If another BIU has the same Group Addresses, then the new BIU will join the network by adding itself to the group. It will learn something about the network by listening to three polling cycles, though usually not enough to identify the number of BIUs in the group. However, it will then identify a BIU belonging to its own group and identify its predecessor in the group. Using the above example a BIU GRPMMM that belongs to the group Grpaaa will enter this network by attempting to be polled in this group between GRPAAA and GRPBBB. Further assume that the network polling sequence is up to a poll of BBBBBB by AAAAAA. Then GRPMMM will then interrupt this poll, causing a collision. As soon as this collision ends, and randomly within 16.0 $\mu$ secs., BIU GRPMMM inserts itself into the network as a member of Grpaaa and informs the group that a new BIU has been added.

BIU GRPMMM has been inserted normally in the polling sequence. However, this BIU does not necessarily know the number of BIUs in the group. It will set its own value of GRPNBR to an overly large default value, e.g., 1000. It must learn the correct value for the number of nodes in the group after three polling sequences of the group. Until that time, this BIU will not respond properly to line silences.

Faults/Repair in ring start-up:

If a fault/collision occurs in the first (only) node's start-up, that node will reenter the Learning state. If a collision or fault occurs when a node attempts to join a single node, then the adding node will reenter the Learning state.

Faults/Repair in ring polling:

Each BIU in the communication system retains the responsibility of responding in ring order if its preceding BIU is silent. Therefore, each BIU listens to the line, and does so especially after it has one particular address consistently respond, then the BIU re-learns which BIU it polls. If the BIU has data to transmit, a normal data frame is then sent. If the BIU has no data to send, then it is a poll of the next BIU it would normally poll. A message to all other BIUs in the group notifying them of the repair may be sent. This method works independent of the number of BIUs failing between the polling BIU and the next BIU due to answer. Naturally, if the only BIU responding is this one, the BIU immediately enters the Auto-poll state.

Faults/Repair in group start-up:

Faults/repair in group start-up are handled identically to that for Unique Address BIUs.

Faults/Repair in group polling:

Each BIU notes the BIU that has responded to the group poll. If the node at the previously used address has failed to respond for a predetermined number of times, then the last BIU in the group heard is identified and after all members of the group are notified of the new number of BIUs in the Group, the repair is made.

Figure 5:
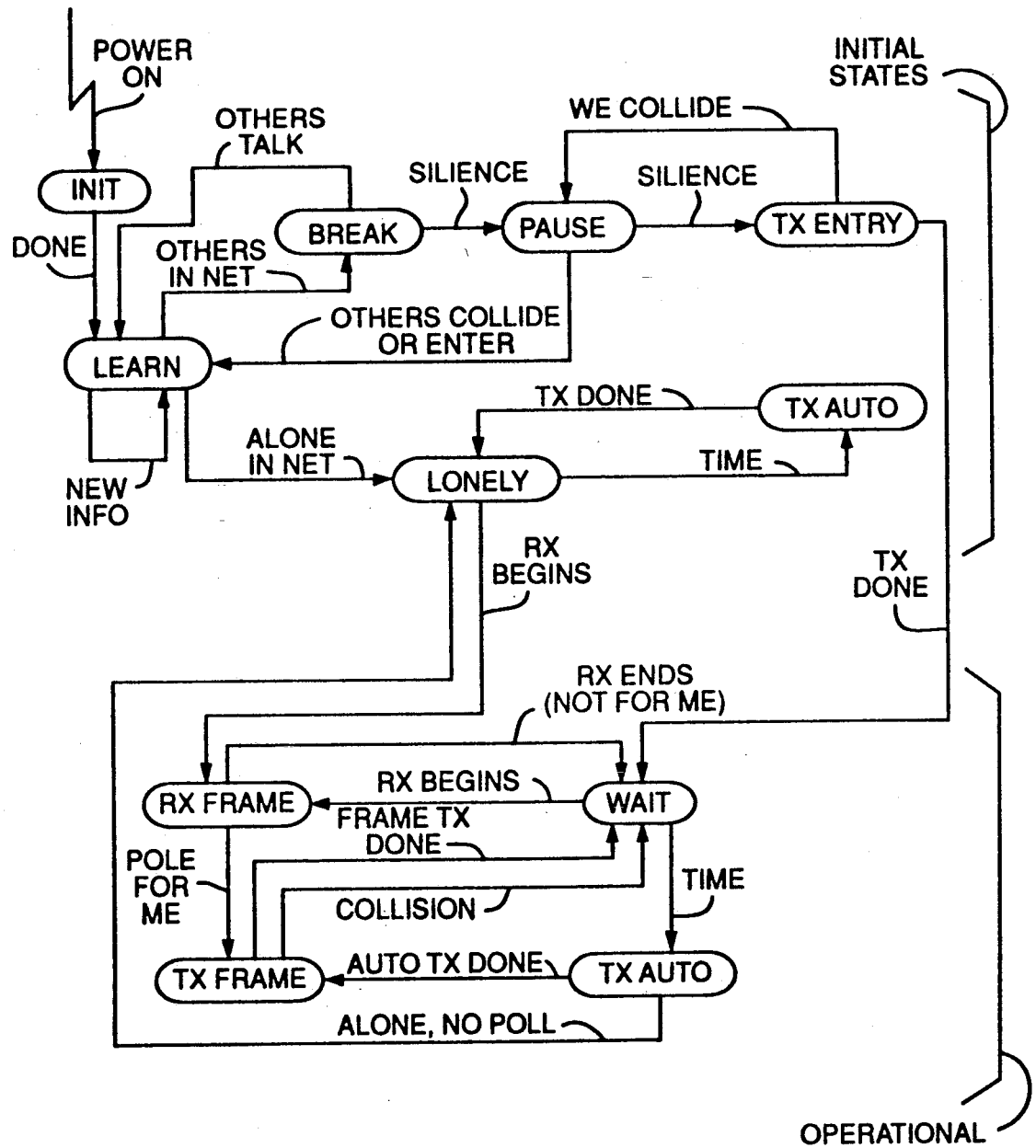
FIG. 5 is a block diagram of logic state transitions which may be used in a communication system in accordance with the present invention.
Figure 6:
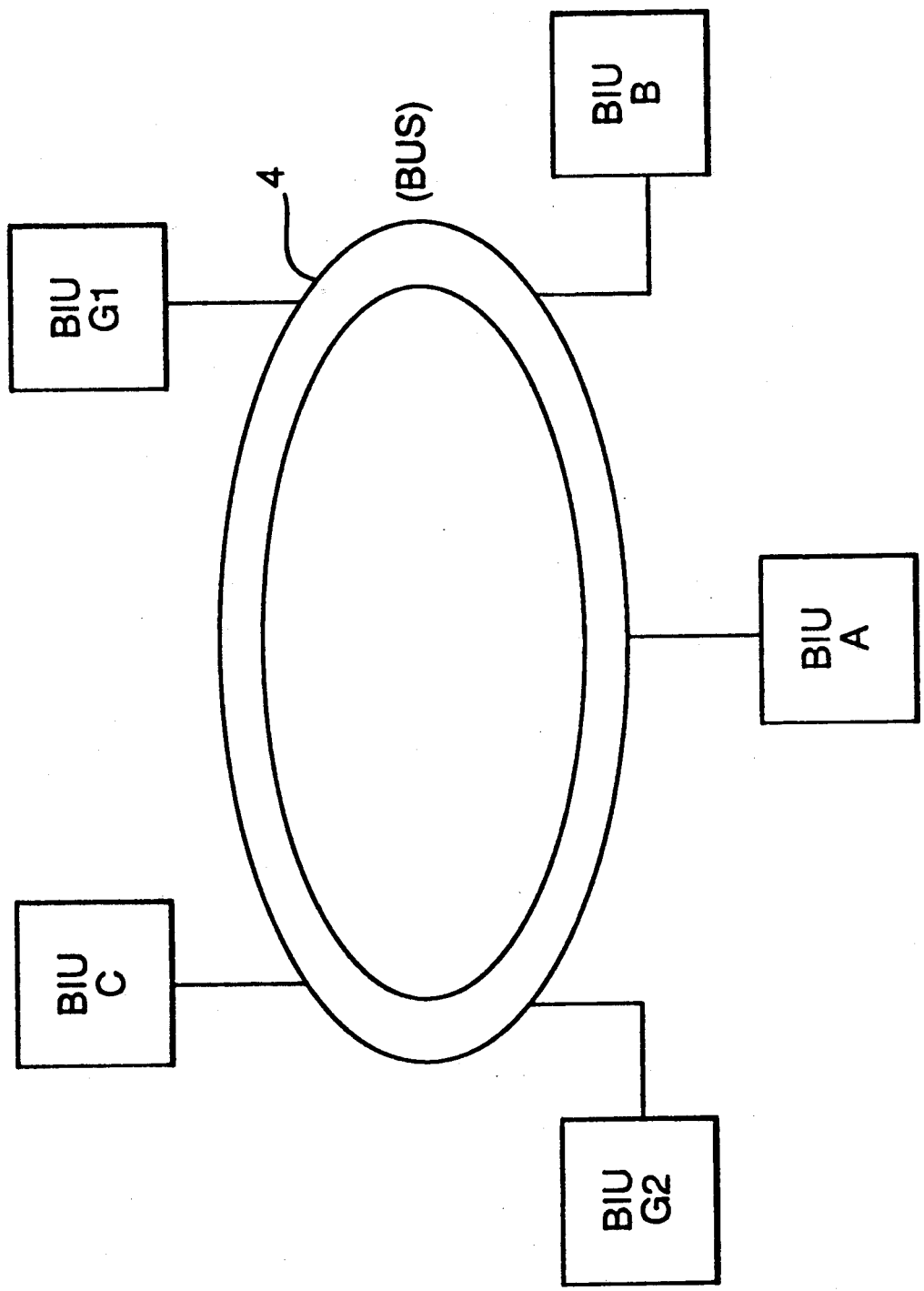
FIG. 6 is a diagram of a communication system of the type that may use the method of the present invention.

With reference to FIG. 5, a system which contends the communication of a network in accordance with the present invention may operate in the following states in each BIU:

INIT, the state that the communication controller is in upon reset. After performing initialization of the hardware, the BIU enters the next (LEARN) state.

LEARN, the state that the communication controller of the BIU enters from the INIT state. It stays in this state, learning the configuration of the network, for three polling cycles, and then enters either the BREAK state (if other BIUs are polling) or the ALONE state.

ALONE, the state the BIU is in when it hears no other BIUs polling.

TxALONE, the state entered about once per second from the ALONE state, if no other BIUs are heard. In this state the BIU will issue an auto-poll. At the conclusion of this, the BIU re-enters the ALONE state. If another BIU is heard, then the BIU will enter the RxFRAME state.

BREAK, the state that the communication controller of the BIU enters when it has "learned" where in the logical ring it wishes to enter. While in this state, it will intrude on the bus with a purposeful collision, and thereupon enter the PAUSE state.

PAUSE, the waiting state where, if no other frames or transmissions are heard for a random time of 20 microseconds maximal duration, may now enter the TxENTRY state. If other transmissions are heard, the BIU re-enters the LEARN state.

TxENTRY, the state wherein a Node Management message is issued that allows the BIU to become another (polling) member of the Network logical ring. If the message is output in its entirety, then the BIU enters the WAIT state, and is operational; if the output of the message collides with another message, the BIU re-enters the PAUSE state.

The above states are entered during the initialization of the BIU. The operational states of the BIU follow.

WAIT, the state that the communication controller of the BIU enters and maintains while waiting for a frame to begin (it then enters the RxFRAME state) or for a time-out (it then enters the TxAUTO state).

RxFRAME, the state the BIU is in while receiving and decoding an incoming frame. If there is a collision, an ACK, or an incoming frame not for this BIU, it re-enters the WAIT state.

TxFRAME, the state that the communication controller enters to output either a poll or a message. When this frame is completed (or if this frame is collided with), the BIU enters the WAIT state.

TxAUTO, the state that the communication controller of the BIU enters from the WAIT state when its timer waiting or a frame to begin has expired. If there are other BIUs present, then the BIU enters the TxFRAME state in order to issue its poll (or a Node Management message altering the network configuration as now "learned"). If the BIU has "learned" that it is the only BIU present, it will enter the LONELY state.

A preferred embodiment of a polling signal in the present invention may include the following:

| |
|---|
| 2 octets of PREAMBLE/synching |
| 1 octet START |
| 6 octets of TOKEN DESTINATION ADDRESS |
| 1 octet of PROTOCOL VERSION (e.g., ASCII "A") |
| 1 octet of FRAME CONTROL |
| 6 octets of FRAME SOURCE ADDRESS |
| IF THERE IS DATA ASSOCIATED WITH THE FRAME: |
| 6 octets of DATA DESTINATION ADDRESS |
| 2 octets of DATA LENGTH (counting from protocol version) |
| 16 octets minimum up to 4096 octets maximum of DATA for a message |
| TERMINATING EVERY FRAME: |
| 4 octets of FRAME CHECK SEQUENCE |
| 1 octet STOP |

ADVANTAGES OF THE PRESENT INVENTION

The polling protocol in the present invention is different from the IEEE 802.4 standard Token Bus Protocol in several critical ways. Each BIU may poll (i.e. send a token to) the next BIU in the same transmission as data destined to any BIU. It also identifies the source and destination of the transmission in this polling transmission. The protocol in the present invention learns various features of the network, allowing it to add to the network or repair the network significantly faster than the IEEE 802.4 protocol. It also may organize the sequencing of the BIUs and group of BIUs to allow faster polling.

Polling is undistrubed until a new BIU wishes to join the network. If no BIU wishes to join the network, the polling frequency is maximal. However, if one wishes to join, the new BIU first learns where it wishes to break into the polling sequence, and then the new BIU interrupts (collides with) a frame from a BIU already in the network. The interrupted BIU remains silent. The entering BIU sends a signal that requests an active network BIU to poll it. The polling of the network continues. If several BIUs wish to enter the network at the same time, the process is probabilistic. For example, if 100 BIUs were to try to enter and collide, only 10% of these (perhaps 10) would retry at the next timed window of opportunity, and 10% of these (perhaps 1) would try again, perhaps successfully. In order to become a BIU that functions within the network, each BIU must learn the identifiers for "This Station", the "Next Station" it polls, and the "Number of Addresses" active on the network. If the BIU has a group address, it must also learn the "This Group", the "Previous Group" which activates it, and the "Number of BIUs" active in the group.

A preferred embodiment of the invention uses various types of signals for node management, data management, and polling. The token is cojoined with the data in a single signal packet.

A less complex LAN repair methodology than under IEEE 802.4 is allowed by the adaptive learning technique used by each BIU. Each BIU counts each poll-time-duration of line silence as a poll. So only one BIU may consider itself polled by that silence, and the ring continues. Operational BIUs usually continue to operate with full service and at about the same polling frequency during the logical ring repair. For example, assume the logical polling ring with five BIUs: A--B--C--D--E--A--B--C--D . . . etc. If BIU C fails, BIU D, after issuing a poll, expects to be polled after four more polls. Thus, E polls A (1), A polls B (2), B polls C (3) and then silence (counted as 4). D responds, polled by the silence as fast as if C were operational. Further, each BIU listens to the identifier of the BIU responding to its poll so that when BIU B polls BIU C, normally BIU C responds. However, when BIU C fails, there is a consistent response of BIU D to the poll of BIU C. BIU B will learn, after a predetermined number of repetitions, that it should poll the BIU that responds, BIU D. All BIUs also learn, again after the predetermined number of consistent polling cycles, that there are now only 4 BIUs in the network. Thus the ring is repaired. If BIUs C and D both failed during one cycle, the poll of BIU C by BIU B would be answered by BIU E after two poll-time-durations. In this manner, any number of failures should be repaired after the predetermined number of polling cycles.

Groups of BIUs have not only those properties specified by IEEE 802.4, but also one additional property: when a group is polled for output, only one station in the Group will respond. Thus a polling cycle with groups may have less addresses than stations (BIUs). Two effects of this are: (1) with less addresses in the polling cycle, the logical ring is polled more frequently, and (2) classes of BIUs are possible, those with a high polling frequency (e.g., associated with a central processing unit), and those requiring less frequent output polling (e.g., those associated with manual input).

Those BIUs in a group are polled with a group address poll, and they respond in sequence. They follow this sequence because they learn which BIU in their group responds before them to the group poll. For example, if BIUs A, B, C, and D belong to a group and respond to a group poll in that order, then BIU B is triggered to respond to the group poll by BIU A's response, BIU D is triggered to respond to the group poll by BIU C's response, etc.

The invention has been described herein in detail and additional variations have been indicated. Other variations will be evident to those skilled in this art. Accordingly, it is intended that all variations within the true scope of the invention are to be covered in the following claims.

We claim:

1. In a communication system comprising plural transceivers interconnected by a transmission medium, a method of communicating comprising the steps of:
   (a) transmitting from one of said transceivers a signal packet along said medium, said signal packet including a token signal indicating the next of said transceivers to communicate on said medium and data for at least one of said transceivers;
   (b) repeating step (a) until all transceivers have been indicated, and
   wherein an additional transceiver to be added to the system performs the steps of;
   (c) monitoring transmissions on the medium;
   (d) determining from the monitored transmissions the number of transceivers to which said token signal is being passed;
   (e) identifying from said monitored transmissions the one of said transceivers that is most closely connected to the point on the medium at which the additional transceiver is connected and the one of said transceivers that is most distantly connected to the point on the medium at which the additional transceiver is connected; and
   (f) transmitting a management message on the medium indicating that the additional transceiver is to receive said token signal in turn between the two identified transceivers.

2. In a communication system comprising plural transceivers interconnected by a transmission medium, a method of communicating comprising the steps of:
   (a) transmitting from one of said transceivers a signal packet along said medium, said signal packet including a token signal indicating the next of said transceivers to communicate on said medium and data for at least one of said transceivers;
   (b) repeating step (a) until all said transceivers have been indicated;
   (c) monitoring at an additional transceiver to be added to the system time intervals between the transmission by the transceivers of said signal packet on the medium; and
   (d) inserting the additional transceiver within the indicated order of said transceivers responsively to said monitoring.

3. The method of claim 2 wherein the additional node is inserted responsively to the time interval between a poll by a first one of said transceivers and an answer to the poll by a second one of said transceivers.

4. In a communication system comprising plural transceivers interconnected by a transmission medium, a method of communicating comprising the steps of:
   (a) transmitting from one of said transceivers a signal packet along said medium, said signal packet including a token signal indicating the next of said transceivers to communicate on said medium and data for at least one of said transceivers;
   (b) repeating step (a) until all said transceivers have been indicated;
   (c) monitoring at an additional transceiver to be added to the system the transmission medium to determine an appropriate time for the additional transceiver to transmit a message so as to cause a collision with a signal from one of said plural transceivers; and
   (d) transmitting a message by said additional transceiver so as to cause a collision with a signal from one of the transceivers.

5. The method of claim 4 wherein the appropriate time is determined responsively to a time relationship of signals being transmitted on the medium.

6. The method of claim 4 wherein the appropriate time is determined responsively to the length of time between a poll by a first one of said transceivers and an answer to the poll by a second one of said transceivers.

7. In a communication system in which plural nodes share a transmission medium, a method of allocating periods of time during which said nodes may transmit messages on the medium, comprising the steps of:
   (a) transmitting a token signal on the medium among the nodes in a predetermined order, said token signal indicating that the node receiving the token signal may transmit on the transmission medium for a successive, predetermined time period;
   (b) logically grouping plural of said nodes such that only one of said logically grouped nodes is the node indicated to receive the token signal each time that said token signal is received by said logically grouped nodes.

8. In a communication system wherein plural communicating nodes share a transmission medium and wherein access to transmit on the medium is determined by receipt of a signal which is passed along the medium among the nodes in a predetermined order, a method of establishing a new order of token passing upon the failure of one of the nodes comprising the steps of:
   (a) monitoring the medium at each node to determine the number of nodes transmitting on the medium;
   (b) passing a token signal at regular intervals among each of the nodes which is permitted to transmit on the medium, said token indicating that the node receiving the token may transmit messages for a predetermined time period and being passed in a predetermined order to each of said nodes;
   (c) determining at each node from the length of the intervals and from the number of nodes the length of time to be expected to pass between successive receptions of the token;
   (d) transmitting at each node upon receipt of the token;
   (e) transmitting at each node if said determined length of time is exceeded without the receipt of a token;
   (f) updating at each node the number of nodes in the system if a node fails to receive a token within said determined length of time for a predetermined number of occurrences; and
   (g) repeating indefinitely steps (b) through (f).

9. The method defined in claim 8, further comprising the steps of:

(h) monitoring at one of said nodes the medium to determine whether transmissions are being sent by nodes other than said one node; and (i) if messages are not being sent by said other nodes, periodically transmitting by said one node a self poll message addressed to said one node.

10. The method of claim 9 further comprising the steps of:

(j) if messages are being sent by said other nodes, colliding with one of the messages sent by other nodes to inform the other nodes that an additional node is joining the system.

11. In a token ring communication system comprising plural transceivers interconnected by a transmission medium for conveying a token signal and communications among said transceivers, wherein the token signal is passed in turn to each of the transceivers and each of said transceivers has a unique identifier, said token signal indicating the transceiver which is to communicate on the medium during a succeeding time interval, a method of adding an additional transceiver to the communication system wherein each transceiver performs the method comprising the steps of:

(a) monitoring the passage of the token signal among said transceivers;

(b) determining from said monitored passage the number of transceivers to which the token signal is being passed;

(c) identifying from said monitored passage the two transceivers which have the longest time interval between receipt by the monitoring transceiver of the transmission of the token signal from the first said two transceivers to receipt of the transmission of the token signal from the second of said two transceivers; and (d) transmitting a message on the medium indicating that the additional transceiver is to receive the token in turn between the identified transceivers.

12. The method as defined in claim 11 wherein step (c) identifies the transceivers which are most closely connected in time to the point on the medium at which the additional receiver is connected.

13. The method as defined in claim 12 wherein step (c) further comprises the step of determining from said monitored passage the time delays between transmission of the token signal by each one of said transceivers to another of said transceivers and reply to the transmission by another of said transceivers.

14. A method of communicating data on a communication medium shared by plural transceivers comprising the steps of:

(a) establishing repetitive time sequence frames, each frame having data fields adapted for transporting data bits along the medium;

(b) determining an order in which the plural transceivers are given access for transmitting on the medium;

(c) transmitting in each frame, to the next of said transceivers, in the determined order, a signal with said data fields indicating that the transceiver receiving the transmitted signal is to transmit in the next of said time frames, the length of said data fields being substantially greater than the length of the transmitted signal;

(d) acknowledging, by the receiving transceiver in said next time frame, receipt of the transmitted signal if the receiving transceiver is operating;

(e) acknowledging, by the transceiver next in order after the receiving transceiver, receipt of the transmitted signal, if the receiving transceiver does not respond in said next time frame; and (f) eliminating the receiving transceiver from the determined order, if the receiving transceiver does not respond to a predetermined number of the transmitted signals.

* * * * *